(12) United States Patent
Chen et al.

(10) Patent No.: US 9,235,942 B2
(45) Date of Patent: Jan. 12, 2016

(54) NON-CONTACT POWER SUPPLY DEVICE FOR AN ELECTRONIC LOCK

(71) Applicants: Chung-Yu Chen, Taichung (TW); Yen-Lun Wang, New Taipei (TW)

(72) Inventors: Chung-Yu Chen, Taichung (TW); Yen-Lun Wang, New Taipei (TW)

( * ) Notice: Subject to any disclaimer, the term of this patent is extended or adjusted under 35 U.S.C. 154(b) by 577 days.

(21) Appl. No.: 13/741,718

(22) Filed: Jan. 15, 2013

(65) Prior Publication Data

US 2014/0197692 A1 Jul. 17, 2014

(51) Int. Cl.
E05B 47/00 (2006.01)
H02J 17/00 (2006.01)
H02J 7/00 (2006.01)
G07C 9/00 (2006.01)
H02J 5/00 (2006.01)
H02J 7/02 (2006.01)

(52) U.S. Cl.
CPC ............ *G07C 9/00174* (2013.01); *H02J 5/005* (2013.01); *H02J 7/025* (2013.01); *G07C 2009/00642* (2013.01)

(58) Field of Classification Search
CPC .. G07C 9/00174; G07C 9/00; G07C 9/00309; H02J 5/005; H02J 7/025; E05B 47/00

USPC ........................................ 307/104; 70/91, 277
See application file for complete search history.

(56) References Cited

U.S. PATENT DOCUMENTS

2009/0308116 A1* 12/2009 Lambrou ................ E05B 47/02
70/277

* cited by examiner

*Primary Examiner* — Rexford Barnie
*Assistant Examiner* — Xuan Ly
(74) *Attorney, Agent, or Firm* — Ming Chow; Sinorica, LLC

(57) ABSTRACT

A non-contact power supply device of an electronic lock includes a power supply unit and an electronic lock, and the power supply unit is oppositely provided with a power supply member and a power-receiving member. The power supply member is connected with a power source, able to produce a radio-frequency signal, while the power-receiving member can induce and receive the radio-frequency signal to form electronic energy to be supplied to the electronic lock for operation. Thus, the power supply member and the power-receiving member can carry out wireless signal transmission to have electronic energy supplied to the electronic lock for locking and unlocking a door, able to avoid the trouble that the battery unit of a conventional electronic lock must periodically replaced with a new one.

7 Claims, 3 Drawing Sheets

NON-CONTACT POWER SUPPLY DEVICE FOR AN ELECTRONIC LOCK

BACKGROUND OF THE INVENTION

1. Field of the Invention

This invention relates to a non-contact power supply device of an electronic lock.

2. Description of the Prior Art

Conventional locks are mainly of mechanical-typed structure. In recent years, electronic science and technology have been progressive greatly, and such electronic control systems as fingerprint identification systems, chip induction systems and the like are also applied to door locks to make up electronic locks for enabling people to lock and unlock a door relying on personal special fingerprint or chip induction, needless to employ a key.

Referring to FIG. 1, a conventional electronic lock 1 to be assembled on a door plank 2 includes an electronic controller 3 installed between two door knobs 4 and provided with in the interior with a battery unit 5 connected with the electronic controller for supplying the electronic controller 3 with electrical energy needed by operation of the electronic lock 1.

The conventional electronic lock 1 is installed therein with the battery unit 5 for supplying the electronic controller 3 with electrical energy; however, when the battery unit 5 runs out of power, the electronic controller 3 will be unable to function for controlling the electronic lock 1 to lock and unlock a door. Therefore, the battery unit 5 has to be periodically replaced with a new one to avoid the battery unit 5 exhausting power and making the electronic lock 1 unable to function, thus resulting in much inconvenience in use.

SUMMARY OF THE INVENTION

The objective of this invention is to offer a non-contact power supply device of an electronic lock, able to produce a radio-frequency signal to be transmitted and induced to form electrical energy needed by operation of an electronic lock.

The non-contact power supply device of an electronic lock in the present invention includes a power supply unit and an electronic lock. The power supply unit is RFID (radio frequency identification), oppositely formed with a power supply terminal and a power-receiving terminal, which are respectively provided with at least one power supply member and a power-receiving member. The power supply member is connected with a power source, able to produce a radio-frequency signal, and the power-receiving member is set at a location opposite to the power supply member, able to receive and induce the radio-frequency signal of the power supply member to form electrical energy, with a certain gap formed between the power supply member and the power-receiving member. The electronic lock is installed at one side of the power-receiving terminal and connected with the power-receiving member that supplies the electronic lock with power and controls the electronic lock. The electronic lock consists of an electronic unit able to trigger the electronic lock to operate.

The power supply member functions to emit the radio-frequency signal, and the power-receiving member receives and induces the radio-frequency signal to form electrical energy to be supplied to an electronic lock, able to solve the trouble that the battery unit of a conventional electronic lock must be replaced with a new one periodically.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
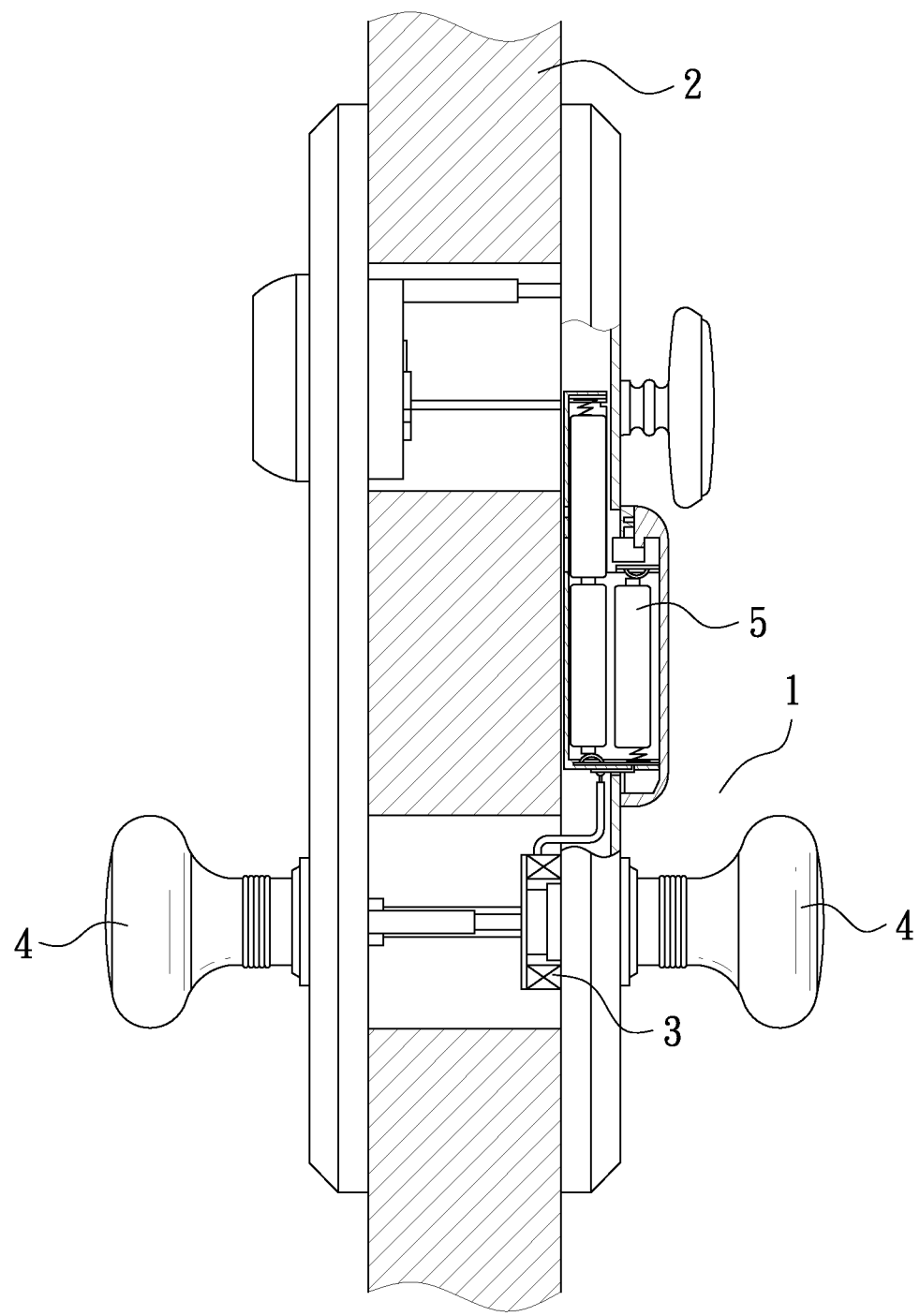
FIG. 1 is a schematic view of a conventional electronic lock assembled on a door plank.
Figure 2:
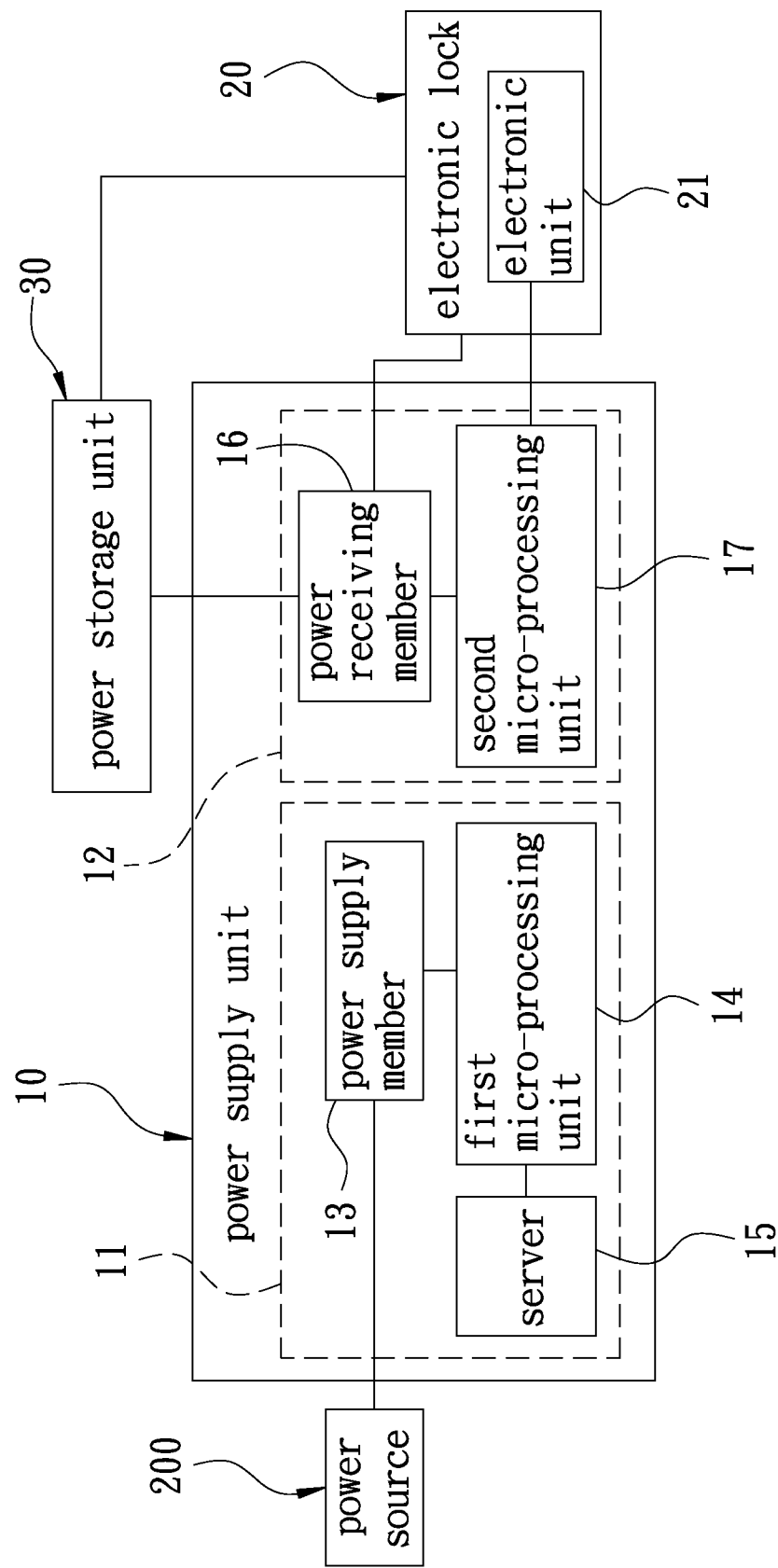
FIG. 2 is block diagram of a non-contact power supply device of an electronic lock in the present invention.

A preferred embodiment of a non-contact power supply device of an electronic lock in the present invention, as shown in FIG. 2, includes a power supply unit 10, an electronic lock 20 and a power storage unit 30 as main components combined together.

The power supply unit 10 is RFID (radio frequency identification), formed with a power supply terminal 11 and a power receiving terminal 12 positioned oppositely. The power supply terminal 11 has one side provided with a power supply member 13, a first micro-processing unit 14 and a server 15, and the power-receiving terminal 12 has one side disposed with a power-receiving member 16 and a second micro-processing unit 17. The power supply member 13 has one terminal connected with a power source 200 and another terminal connected with the first micro-processing unit 14, which is connected with the server 15. The power supply member 13 is able to produce a radio-frequency signal (not shown) to be mixed into the first micro-processing unit 14 to be processed and mixed with a control signal (not shown) and then, the radio-frequency signal and the control signal are together transmitted by the power supply member 13, while the control signal is obtained by the server 15. The power-receiving member 16 induces and receives both the radio-frequency signal and the control signal and further mix them into the second micro-processing unit 17 to be processed therein, and after inducing and receiving both the radio-frequency signal and the control signal, the power-receiving member 16 will form electrical energy.

The electronic lock 20 is installed at one side of the power-receiving terminal 12 and connected with the power-receiving member 16 that supplies the electronic lock 20 with power and controls the electronic lock 20. The electronic lock 20 consists of an electronic unit 21 connected with the second micro-processing unit 17 and able to trigger the electronic lock 20 to operate.

The power storage unit 30 positioned at one side of the power-receiving terminal 12 has one terminal connected with the power-receiving member 16 and another terminal connected with the electronic lock 20. The power storage unit 30 is able to store the electrical energy that is induced and produced by the power-receiving member 16. In this preferred embodiment, the power storage unit 30 can be a battery unit or a super capacitor.

Figure 3:
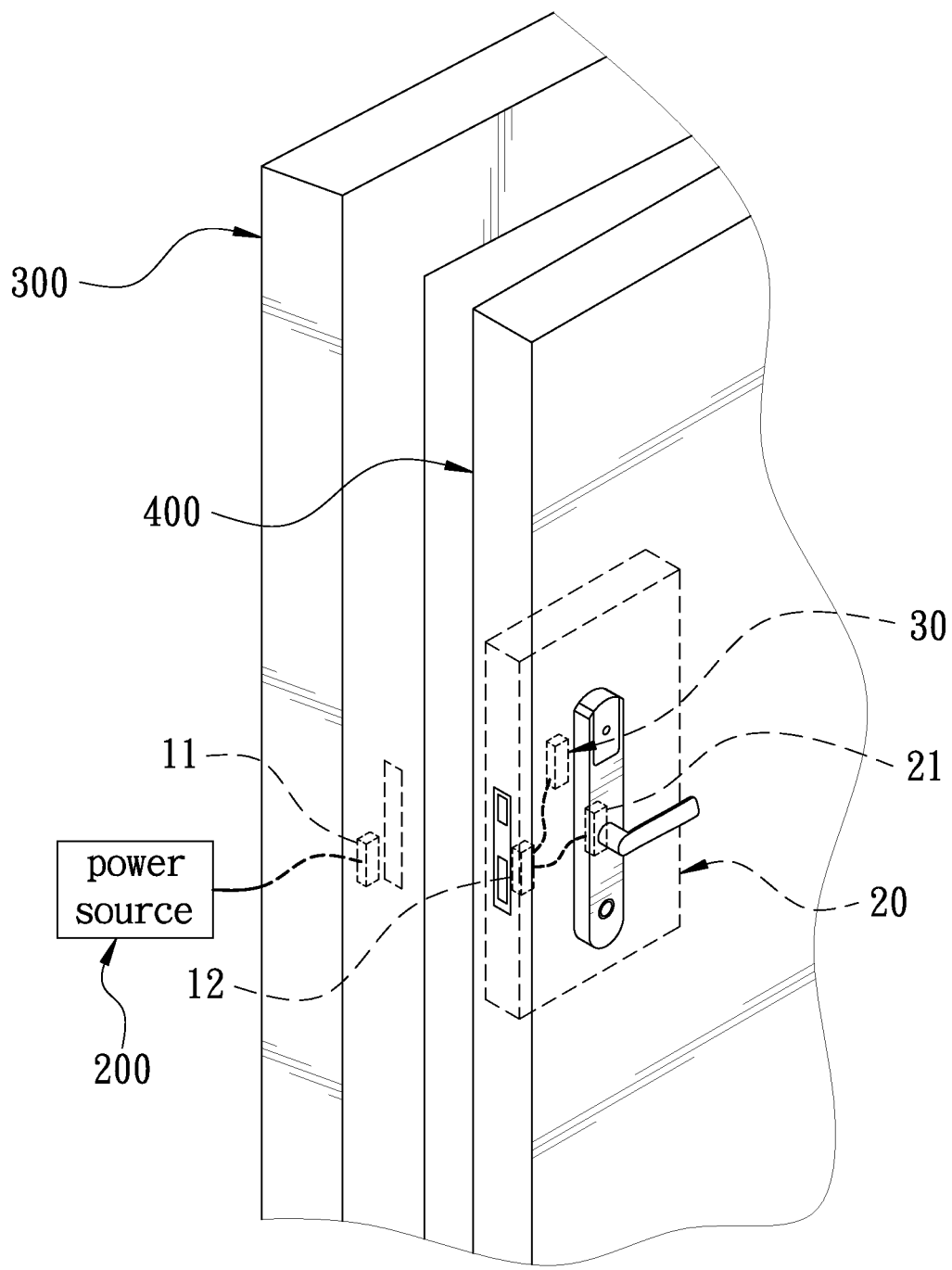
FIG. 3 is a perspective view of the non-contact power supply device of an electronic lock in a using condition in the present invention.

In assembling and using, referring to FIG. 3, the power supply terminal 11 of the power supply unit 10 of the non-contact power supply device of an electronic lock 20 is located at the peripheral edge of a door frame 300, while the power-receiving terminal 12 is positioned at the peripheral edge of a door 400 and the electronic lock 20 is installed on the door 400 at a 400 at a location opposite to the power supply terminal 11, with a certain gap formed between the power supply terminal 11 and the power-receiving terminal 12. When the door 400 is closed, the power supply member 13 is able to have the server 15 picking the control signal via the first micro-processing unit 14 and simultaneously transmits the control signal together with the radio-frequency signal to the power-receiving member 16 to be processed by the second micro-processing unit 17 and mixed into the electronic unit 21 to be collated and examined when a user triggers the electronic lock 20 and in case of matching, the electronic unit 21 will trigger the electronic lock 20 to lock or unlock the door. Under this condition, the electronic lock 20 is supplied with power to operate by the power-receiving member 16 not by the power storage member 30. On the contrary, when the door is unlocked or power supply is cut off, the power-receiving member 16 is unable to carry out action of induction and power supply, while the power supply member 13 produce a feedback signal (not shown) to be transmitted back to the server 15 to make the power supply member 13 aware that the door 400 is in an unlocked state via the server 15 and at this time, the electronic unit 21 can make use of the power storage unit 30 to serve as transient spare power to supply the electronic lock 20 with power for operating immediately. Moreover, since the power supply unit 10 in this preferred embodiment is RFID (radio frequency identification), and both the power supply member 13 and the power-receiving member 16 can automatically receive signal from or transmit signal to each other; therefore, this invention can be employed for carrying out information identification at the same time, such as control at entrance for supervising people to get in or out and personal administration of going on and off duty, and this invention can also save the trouble of wiring of a conventional electronic lock.

While the preferred embodiment of the invention has been described above, it will be recognized and understood that various modifications may be made therein and the appended claims are intended to cover all such modifications that may fall within the spirit and scope of the invention.

What is claimed is:

1. A non-contact power supply device of an electronic lock comprising:
a power supply unit being RFID (radio frequency identification), said power supply unit formed with a power supply terminal and a power-receiving terminal positioned oppositely, said power supply terminal and said power-receiving terminal respectively provided with at least one power supply member and one power-receiving member, a certain gap formed between said power supply member and said power-receiving member, said power supply member connected with a power source and able to produce a radio-frequency signal, said power-receiving member disposed at a location opposite to said power supply member, said power supply terminal having one side provided with a first micro-processing unit, said first micro-processing unit connected with said power supply member, said first micro-processing unit receiving said radio-frequency signal to be mixed with a control signal, said radio-frequency signal and said control signal together transmitted by said power supply member, said power supply terminal having one side set with a server, said server connected with said first micro-processing unit and able to obtain said control signal, said power-receiving terminal disposed with a second micro-processing unit, said second micro-processing unit having one end connected with said power-receiving member, which can induce and receive said radio-frequency signal and said control signal transmitted by said power supply member to form electronic energy; and
an electronic lock installed at one side of said power-receiving terminal and connected with said power-receiving member, electronic lock supplied with power and controlled by said power-receiving member, said electronic lock provided with an electronic unit, said electronic unit connected with another terminal of said second micro-processing unit to enable mixing signals to be processed by said second micro-processing unit and transmitted to said electronic unit for triggering said electronic lock to operate.

2. The non-contact power supply device of an electronic lock as claimed in claim 1, wherein said power-receiving member is positioned in said electronic lock.

3. The non-contact power supply device of an electronic lock as claimed in claim 1, wherein a power storage unit is provided at one side of said power-receiving terminal, said power storage unit having one terminal connected with said power-receiving member and another terminal connected with said electronic lock.

4. The non-contact power supply device of an electronic lock as claimed in claim 3, wherein said power storage unit is a battery unit.

5. The non-contact power supply device of an electronic lock as claimed in claim 3, wherein said power storage unit is a super capacitor.

6. The non-contact power supply device of an electronic lock as claimed in claim 1, wherein said power-receiving terminal is positioned at a peripheral edge of a door.

7. The non-contact power supply device of an electronic lock as claimed in claim 1, wherein said power supply terminal is provided at a peripheral edge of a door frame.

* * * * *